Jan. 15, 1929.
H. M. HAY
1,699,359
MOTOR OPERATED CHUCK
Original Filed Jan. 24, 1923   2 Sheets-Sheet 1
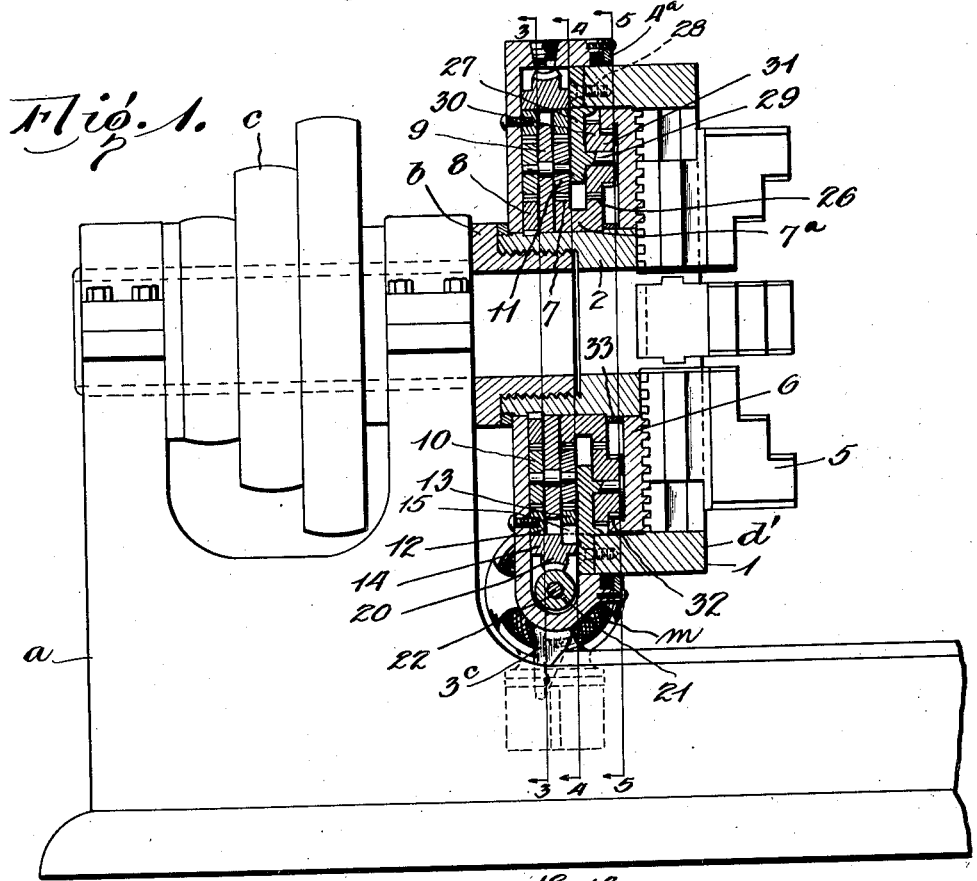
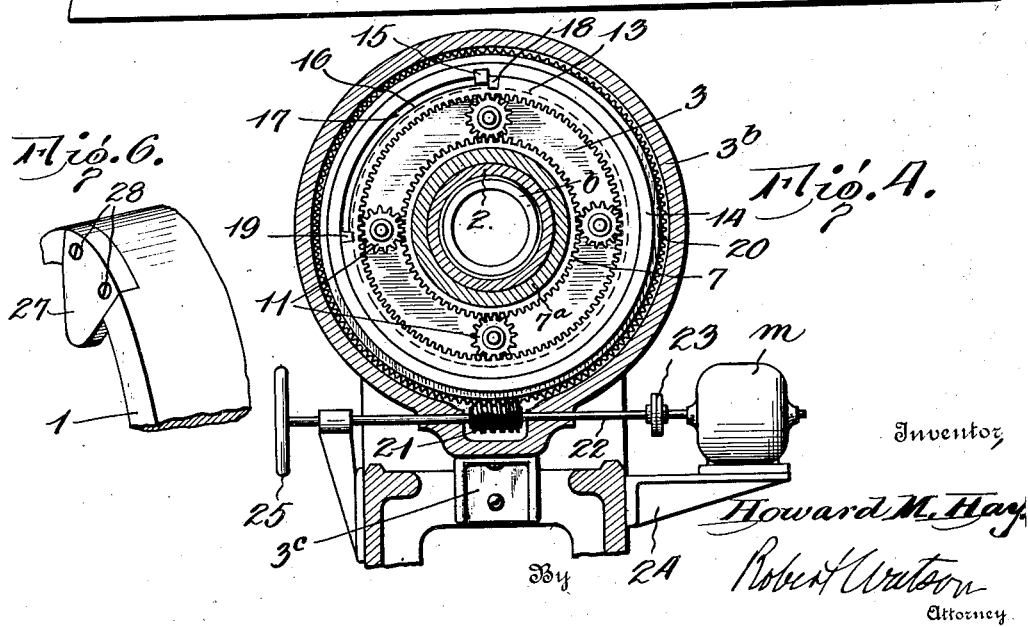
Inventor
Howard M. Hay
By Robert Watson
Attorney Jan. 15, 1929.
H. M. HAY
1,699,359
MOTOR OPERATED CHUCK
Original Filed Jan. 24, 1923    2 Sheets-Sheet 2
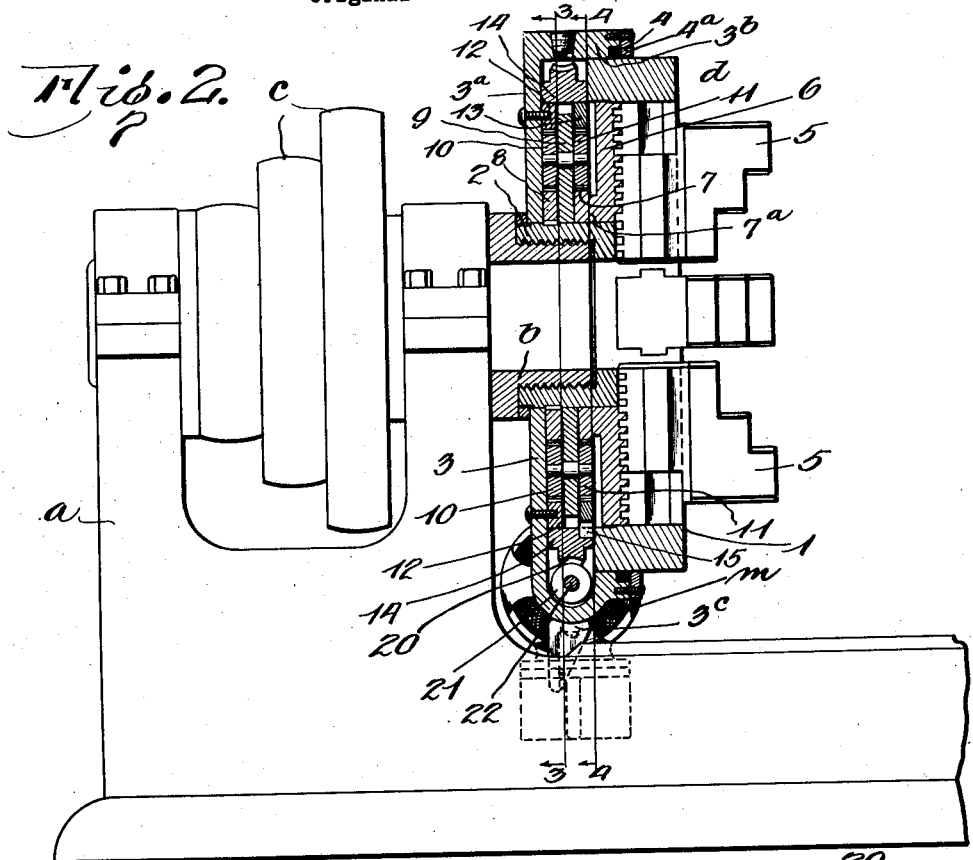
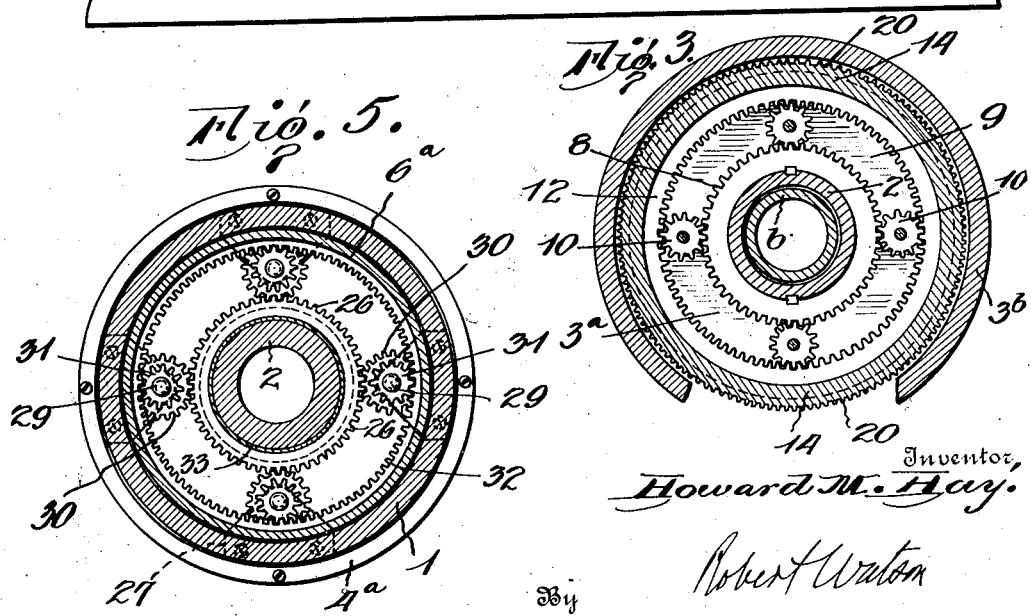
Inventor,
Howard M. Hay.
By Robert Watson
Attorney Patented Jan. 15, 1929.

1,699,359

UNITED STATES PATENT OFFICE.

HOWARD MORTON HAY, OF WENONAH, NEW JERSEY.

MOTOR-OPERATED CHUCK.

Application filed January 24, 1923, Serial No. 614,675. Renewed June 22, 1928.

This invention relates to improvements in motor operated chucks, that is, chucks in which the jaws are actuated in their radial movements by a motor and gearing between the motor and the chuck jaws. In the present invention, the motor is stationary, and through gearing contained in the housing at the rear of the chuck body, the jaws may be actuated while the chuck is in motion or at rest and they may also be actuated by hand power when desired. The invention comprises a lost motion connection in the gearing whereby the motor may accelerate before picking up its load and give a shock or jar to the various parts of the gearing to release the jaws from the work. In the present invention, I have shown a scroll for moving the jaws and reducing gearing for multiplying the leverage on the scroll.

In the accompanying drawing,

Fig. 1 is a side elevation of a lathe head, showing a chuck in central section upon the lathe spindle and the motor for actuating the jaw operating means, the chuck, in this view, being equipped with reducing gears for multiplying the leverage on the scroll;

Fig. 2 is a similar view, showing a chuck with the reducing gears omitted;

Fig. 3 is a section on the line 3—3 of Fig. 1, and also on the line 3—3 of Fig. 2;

Fig. 4 is a section on the line 4—4 of Fig. 1, and also on the line 4—4 of Fig. 2;

Fig. 5 is a section on the line 5—5 of Fig. 1, the parts to the left of the line 4—4 in said figure being omitted for the sake of clearness; and, Fig. 6 is a detail perspective view of a part of the rim of the chuck showing one of the pinion supporting brackets or hangers attached thereto.

Referring to the drawing, $a$ indicates a lathe head in which is mounted a spindle $b$, which is driven through the cone pulleys $c$ in the usual manner. In Fig. 2 of the drawing, is shown a chuck $d$, detachably secured to the spindle. This chuck comprises a body portion 1 and a hub 2, by which the chuck is secured to the spindle. A stationary housing 3 is secured to the lathe head and this comprises a circular plate $3^a$ and a forwardly extending annular flange $3^b$, which encircles the body of the chuck and is provided with a packing ring 4, which engages the periphery of the chuck to prevent dirt and chippings from passing between the chuck and said flange into the housing or casing, and also to prevent oil and grease from flowing out of the housing. This packing ring is held in place by a retaining ring $4^a$. The housing plate $3^a$ has a central opening through which the hub of the chuck extends, as shown, and the housing is prevented from turning with the chuck by an arm or bracket $3^c$, secured to the rim of the housing and to the frame of the lathe. The jaws 5 of the chuck slide in grooves in the body, as usual, and these jaws are adjustable by means of a scroll plate indicated at 6. The scroll plate is journaled upon the hub 2 and is provided at its rear side with a gear 7 which may be integral with the scroll, as shown, or otherwise attached to it. Upon the hub is secured a gear 8 of the same diameter as the gear 7 and spaced from it by a traveling ring 9. This ring carries on its opposite sides a plurality of pairs of pinions 10 and 11, of equal diameter. The pinions 10 engage the gear 8 which is secured to the hub, and the pinions 11 engage the gear 7 which is rotatable upon the hub. The gears 10 also engage a stationary annular rack 12 which is secured to the housing or casing 3, and the gears 11 engage an annular rack 13, which is of the same diameter as the rack 12, but which is adjustable about the axis of the chuck. The racks 12 and 13 are provided with internal teeth and their outer surfaces are smooth and provide a bearing for an arcuate member or ring 14 which rests on said racks and is rotatable about the axis of the chuck. This ring has an inwardly projecting stop 15, as shown in Fig. 4, and the rack 13 has a part of its outer wall cut away, as shown at 16, to provide an arcuate slot 17 between the ring and gear within which the stop 15 can move for a considerable distance without engaging the gear. The stop 15 is a piece of hard steel set into the ring and at the ends of the slot 17 the gear is provided with similar hardened stops 18 and 19. This construction provides a lost motion connection between the ring and gear permitting the former to move a considerable distance in traveling between the stops before engaging the gear.

The ring 14 is provided on its periphery with a worm gear 20 and this gear is engaged by a worm 21 on the shaft 22 which extends transversely of the lathe below the chuck. This shaft is connected through a suitable coupling 23 to the shaft of an electric motor $m$ which is supported upon a bracket 24 at the rear side of the lathe head. At the forward or operator's side of the lathe, the shaft 22 is provided with a hand wheel 25, by which the shaft may be turned.

In the operation of the device shown in Fig. 2, assuming the lathe spindle to be turning and the motor stopped, the gear 8 will rotate with the hub of the chuck and will turn the pinions 10, which will roll around on the internal stationary rack 12, and this will cause the traveling ring 9 to move with the pinions 10 about the axis of the chuck, carrying with it the pinions 11 which will roll on the adjustable rack 13 and travel about the axis of the chuck, carrying with them the gear 7 and the scroll at the same speed as the stationary gear 8 and the body of the chuck. If, now, the motor is started, the ring 14 will turn freely until the stop 15 engages the stop 18, or the stop 19, according to the direction of rotation of the motor, and the ring will then cause the adjustable rack 13 to move relatively to the stationary rack 12. This will cause the idle gears 11 to turn about their axes relatively to the gears 10 and in consequence the gear 7 and the scroll will be moved about the hub, causing an inward or outward movement of the chuck jaws, according to the direction of rotation of the motor. By the use of suitable push button controlling devices for starting and stopping the motor, the jaws may be actuated to grip or release the work, either while the chuck is in motion or while it is stopped. The lost motion connection between the ring 14 and the adjustable rack 13 permits the motor to accelerate before picking up its load, which is important, since it is desirable to jar or knock the parts to loosen the jaws when they are tightly gripped on the work. The hand wheel for operating the screw shaft is provided in order that the operator may reduce the pressure of the jaws upon the work, when desired, as, for instance, when the wall of a hollow article held in the jaws may have been thinned down to a point where the jaws, with the original pressure, would de-form the work.

In Fig. 1, the arrangement is the same as in Fig. 2, except for the addition of reducing gears between the scroll and the sleeve which carries the gear 7, and also the addition of brackets on the chuck body for supporting these reducing gears. In Fig. 1, the parts which are the same as in Figs. 2, 3, and 4, have been similarly marked. Referring to Fig. 1, the gear 7 is carried by a sleeve 7ª, which is adjustable about the hub of the chuck, but this sleeve instead of being directly secured to the scroll, as in Fig. 2, carries a gear 26, of the same diameter as the gear 7 but spaced from it. Brackets 27, secured to the rear edge of the peripheral wall of the chuck and set into said wall so as to be flush with its rear edge, project toward the hub and are provided with studs 29 having thereon gears 30 which mesh with the gear 26. The brackets are secured to the chuck body by screws 28. The gears 30 are of relatively large diameter and secured to them are relatively small pinions 31 which mesh with an internal gear 32, at the back of the scroll plate near its periphery.

With the construction just described, when the spindle is driven and the motor is stopped, the sleeve 7ª will turn with the chuck at the same speed. When the motor is operated the sleeve 7ª will be adjusted about the axis of the chuck in the manner described in connection with Fig. 2, and this adjustment, through the medium of the gears 26, 30, 31, and 32, will cause rotation of the scroll plate with respect to the hub of the chuck and consequently the jaws will be moved inward or outward, depending upon the direction of rotation of the motor. Because of the interposition of the gears between the sleeve 7ª and the scroll plate, the power of the motor will be applied with greater force to the chuck jaws, in gripping or releasing the work, than would be the case if these gears were omitted.

What I claim is:

1. The combination with a lathe spindle and a chuck having a hub mounted on the spindle, of a member journaled on the hub and adapted to operate the chuck jaws when said member is rotated relatively to the hub, gearing between said hub and member for causing said hub and member to rotate in unison, said gearing including two normally stationary annular racks, one of which is adjustable to cause rotation of said member relatively to the hub, means for adjusting the latter rack comprising an arcuate member concentric with said latter rack and having a lost motion connection therewith, and means for moving said arcuate member about its axis.

2. The combination with a lathe spindle and a chuck having a hub mounted on the spindle, of a member journaled on the hub and adapted to operate the chuck jaws when said member is rotated relatively to the hub, gearing between said hub and member for causing said hub and member to rotate in unison, said gearing including two normally stationary annular racks, one of which is adjustable to cause rotation of said member relatively to the hub, and means for adjusting the latter rack comprising a ring concentric with said latter rack and having a lost-motion connection therewith and a stationary motor operatively connected to said ring.

3. The combination with a lathe spindle and a chuck, the latter comprising a scroll for moving the chuck jaws, and having a hub mounted on the spindle, of a stationary housing surrounding the hub, a sleeve journaled on the hub, reducing gears mounted on the housing chuck body and connecting said sleeve with the scroll, gearing between said hub and sleeve for causing said hub and sleeve to rotate in unison, said gearing including two normally stationary annular racks, one of which is adjustable to cause rotation of said sleeve relatively to the hub, and means for adjusting the latter rack.

In testimony whereof I hereunto affix my signature.

HOWARD MORTON HAY.